US008095827B2

(12) United States Patent
Blea et al.

(10) Patent No.: US 8,095,827 B2
(45) Date of Patent: Jan. 10, 2012

(54) REPLICATION MANAGEMENT WITH UNDO AND REDO CAPABILITIES

(75) Inventors: David R. Blea, Tucson, AZ (US); Errol J. Calder, Vail, AZ (US); Steven M. Kern, Tucson, AZ (US); William D. Olsen, Tucson, AZ (US); Jeffrey R. Placer, Tucson, AZ (US); Benjamin J. Randall, Tucson, AZ (US); Todd B. Schlomer, Westminster, CO (US); Jacob A. Stevens, Tucson, AZ (US); John J. Wolfgang, Midlothian, VA (US)

(73) Assignee: International Business Machines Corporation, Armonk, NY (US)

(*) Notice: Subject to any disclaimer, the term of this patent is extended or adjusted under 35 U.S.C. 154(b) by 395 days.

(21) Appl. No.: 11/941,770

(22) Filed: Nov. 16, 2007

(65) Prior Publication Data

US 2009/0132753 A1 May 21, 2009

(51) Int. Cl.
*G06F 11/00* (2006.01)
(52) U.S. Cl. .............................. 714/19; 714/16; 714/42
(58) Field of Classification Search .................... 714/19, 714/6.1, 6.2, 16, 42
See application file for complete search history.

(56) References Cited

U.S. PATENT DOCUMENTS

| | | | | |
|---|---|---|---|---|
| 5,845,292 A * | 12/1998 | Bohannon et al. | ............. | 707/202 |
| 6,041,423 A * | 3/2000 | Tsukerman | ...................... | 714/19 |
| 6,185,699 B1 * | 2/2001 | Haderle et al. | .................. | 714/19 |
| 6,847,971 B1 | 1/2005 | Balaraman et al. | | |
| 6,978,282 B1 * | 12/2005 | Dings et al. | .................... | 707/610 |
| 7,003,695 B2 * | 2/2006 | Li | ..................... | 714/19 |
| 7,133,884 B1 | 11/2006 | Murley et al. | | |
| 7,216,254 B1 * | 5/2007 | Rajan et al. | ...................... | 714/20 |
| 7,290,166 B2 * | 10/2007 | Rothman et al. | ................... | 714/6 |
| 7,502,961 B2 * | 3/2009 | van Ingen et al. | .............. | 714/21 |
| 7,552,358 B1 * | 6/2009 | Asgar-Deen et al. | ............. | 714/6 |
| 2002/0083366 A1 * | 6/2002 | Ohran | ............................ | 714/13 |
| 2002/0174108 A1 | 11/2002 | Cotner et al. | | |
| 2004/0123180 A1 * | 6/2004 | Soejima et al. | ................... | 714/5 |
| 2004/0220961 A1 | 11/2004 | Lee et al. | | |
| 2005/0055385 A1 | 3/2005 | Sinha et al. | | |
| 2005/0278388 A1 | 12/2005 | Butterworth et al. | | |
| 2006/0064416 A1 | 3/2006 | Sim-Tang | | |
| 2006/0069888 A1 * | 3/2006 | Martinez | ....................... | 711/162 |
| 2006/0095478 A1 | 5/2006 | Cherkauer et al. | | |
| 2006/0149798 A1 | 7/2006 | Yamagami | | |
| 2006/0174074 A1 * | 8/2006 | Banikazemi et al. | ......... | 711/162 |
| 2006/0182020 A1 | 8/2006 | Factor et al. | | |

(Continued)

*Primary Examiner* — Scott T Baderman
*Assistant Examiner* — Sarai Butler
(74) *Attorney, Agent, or Firm* — Kunzler Needham Massey & Thorpe

(57) ABSTRACT

A method for replicating a volume of data including selecting a target storage box to receive a physical copy of the actual volume of data stored on the source storage box for replication of the actual volume of data, selecting a point in time storage box to receive a physical copy of actual data stored on the target storage box, physically copying actual data stored on the target storage box to the point in time storage box, performing the replication of the actual volume of data by initiating the physical copying on the target storage box of the actual volume of data, and selectively undoing the physical copying on the target storage box of the actual volume of data by replacing the current actual data stored on the target storage box with the physical copy of actual target storage box data stored on the point in time storage box.

20 Claims, 4 Drawing Sheets

U.S. PATENT DOCUMENTS

| | | |
|---|---|---|
| 2006/0253504 A1 | 11/2006 | Lee et al. |
| 2007/0022146 A1* | 1/2007 | Murley et al. ................. 707/204 |
| 2007/0022319 A1* | 1/2007 | Haselton et al. ................ 714/15 |
| 2007/0038822 A1* | 2/2007 | Correl ........................... 711/162 |
| 2007/0277015 A1* | 11/2007 | Kalos et al. ................... 711/170 |
| 2007/0300033 A1* | 12/2007 | Kano ............................. 711/170 |
| 2008/0010421 A1* | 1/2008 | Chen et al. .................... 711/162 |
| 2008/0172572 A1* | 7/2008 | Beardsley et al. ............... 714/6 |

* cited by examiner

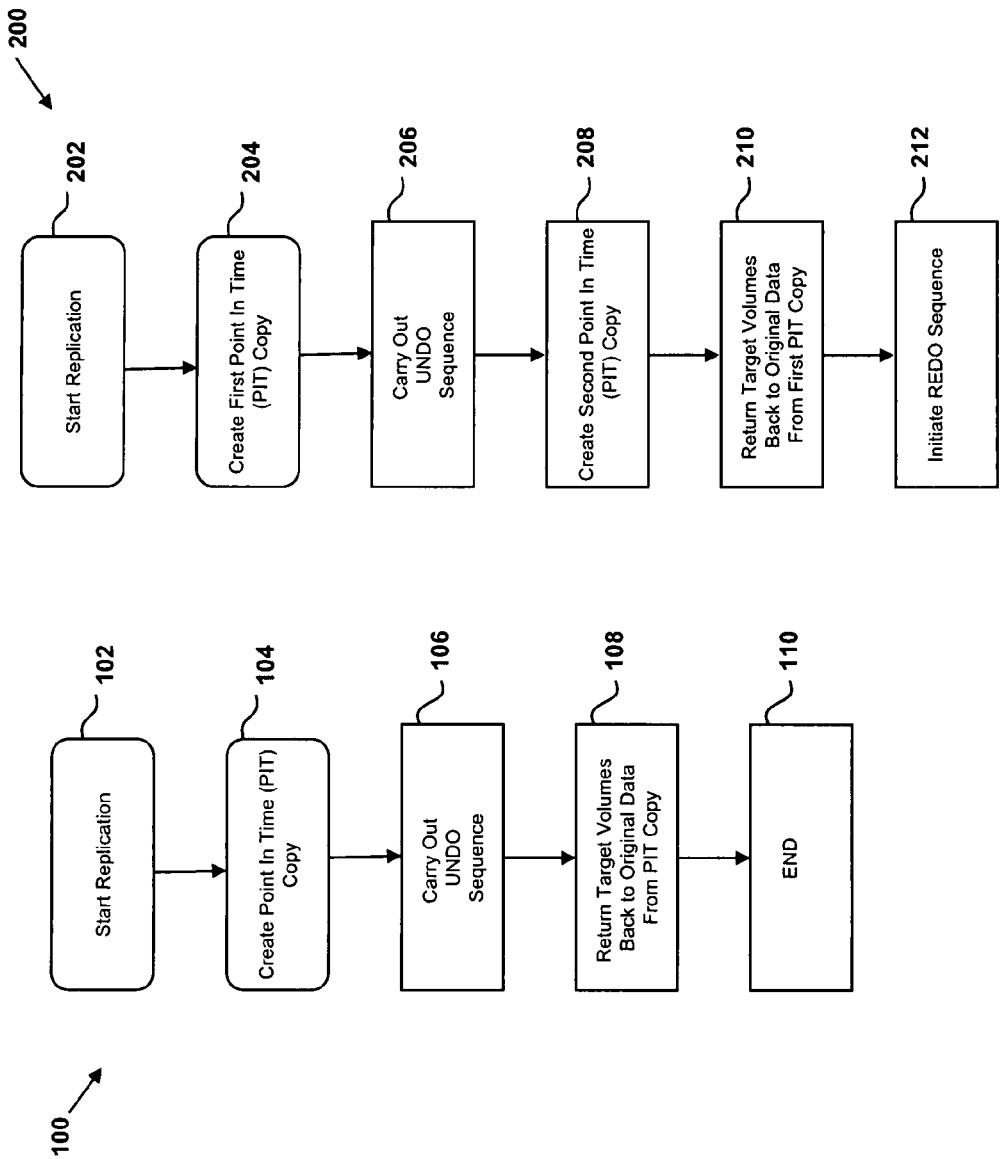

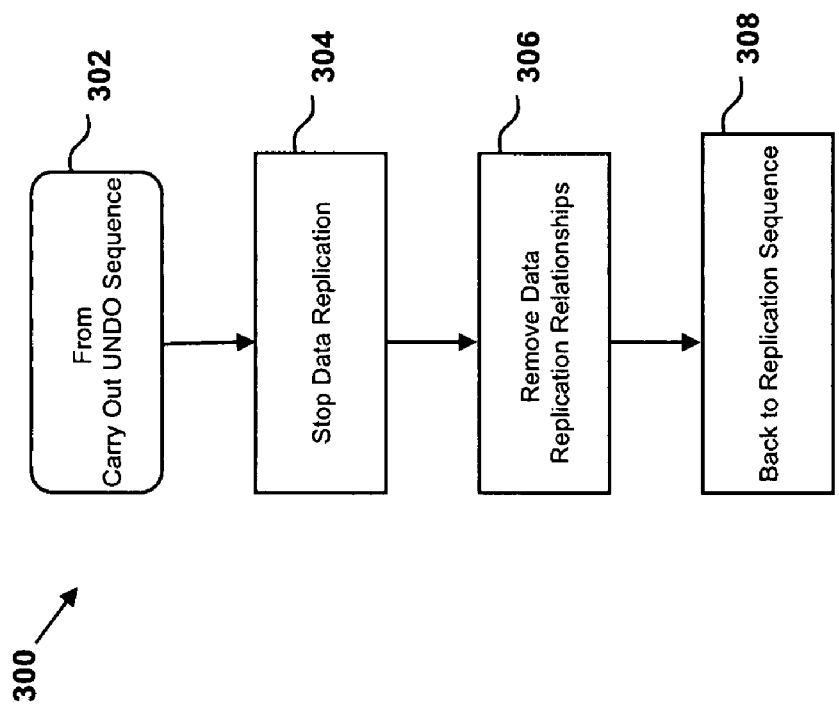

500

REPLICATION MANAGEMENT WITH UNDO AND REDO CAPABILITIES

FIELD OF THE INVENTION

The present invention relates to database systems, and more particularly to systems, methods and computer code for processing a request to UNDO or REDO data replication in a database system.

BACKGROUND OF THE INVENTION

Database systems typically allow administrators or other authorized users to reset the database to an older state. Generally, such resets require that data be retrieved from an external backup of the database. For example, if the data volumes storing the database are backed up daily, an administrator may be able to reset the database to the previous day's state by retrieving the backup data from the previous day. Such backup techniques are desirable for many purposes, and ensure that data is recoverable in the event of catastrophic system errors. It is also desirable to be able to avoid the loss of data during the replication or copying process.

Many replication management systems allow administrators or other authorized users to restore the data and databases in the event of a crash or other error. For example, in the event of a crash or other error, the last known good version of the database may be retrieved and brought up to date to the time of the crash or error using data from a data log or point in time (PIT) copy of the database. This process takes considerable time, requires many steps and is error prone. Thus it would be beneficial to reduce the time, complexity and inherent errors in locating, loading and restoring a database.

At times, an administrator or other user may wish to more frequently and easily recover or restart a database in an earlier known state. In such situations, the use of existing techniques would decrease the availability of the database system and require valuable time, hardware and other resources. It would be desirable to provide improved systems, methods and computer code for recovering and restarting databases in a known earlier state and to ensure that an immediate prior version is available upon the initiation of the replication process. Such systems, methods and computer code should not incur unduly burdensome overhead. It would also be desirable to provide a system, method and computer readable medium with program instructions for reverting a database to a prior state by use of a single command. In addition, it would be desirable to have the capability to selectively process UNDO and REDO commands during data replication when a target volume is overwritten with data from a source volume thus preventing the loss of valuable data. The present invention addresses such needs and provides such systems, methods and computer code.

SUMMARY OF THE INVENTION

Embodiments of the present invention provide a system, method and computer readable medium with program instructions for replicating a volume of data. The method includes selecting a target storage box to receive a physical copy of the actual volume of data and selecting a point in time storage box to receive a physical copy of actual data stored on the target storage box prior to the target storage box receiving the physical copy of the actual volume of data stored on the source storage box. The method also includes physically copying actual data stored on the target storage box to the point in time storage box prior to the target storage box receiving the physical copy of the actual volume of data stored on the source storage box, and performing the replication of the actual volume of data by initiating the physical copying on the target storage box of the actual volume of data stored on the source storage box after the actual data stored on the target storage box is physically copied to the point in time storage box. The method also includes selectively undoing the physical copying on the target storage box of the actual volume of data on the source storage box by replacing the current actual data stored on the target storage box with the physical copy of actual target storage box data stored on the point in time storage box after the actual volume of data stored on the source storage box is physically copied to the target storage box. The computer readable medium includes steps substantial similar to the method. Furthermore the system also performs the steps of the method.

In addition, another embodiment of a method is provided for replicating a volume of data. The method includes establishing at least a source storage volume and a target storage volume, the target storage volume being configured to receive a physical copy of at least one actual data block stored on the source storage volume for replication of the at least one actual data block. The method also includes establishing at least one point in time storage volume, determining a storage capacity of the established point in time storage volume, determining a size of the at least one actual data block, and performing a replication of the at least one actual data block by storing a physical copy of the at least one actual data block stored on the source storage volume on the target storage volume. The method also includes storing on the point in time storage volume a point in time physical copy of the actual data stored on the target storage volume after storing on the target storage volume the physical copy of the at least one actual data block stored on the storage volume. The method also includes modifying the determined storage capacity of the established at least one point in time storage volume based on a size of the stored point in time physical copy and receiving at least one modified actual data block stored on the source storage box after storing the physical copy of the at least one actual data block on the target storage volume. The method also includes comparing the at least one modified actual data block stored on the source storage volume to the physical copy of at least one actual data block stored on the target storage volume and determining at least one difference between the modified actual data block and the at least one actual data block stored on the target storage volume based on the comparison. The method also includes determining a size of the at least one difference and comparing the determined size of the at least one difference to the modified storage capacity of the established at least one point in time storage volume. The method also includes issuing a storage capacity warning when the determined size of the at least one difference is greater than or equal to the modified storage capacity of the established at least one point in time storage volume and storing the at least one difference and a pointer on the point in time storage volume when the determined size of the at least one difference is less than the modified storage capacity of the established at least one point in time storage volume. The method also includes receiving an undo command after storing the at least one difference and pointer on the point in time storage volume, the undo command associated with a request to restore the actual data on the target storage volume to a state corresponding with the pointer, and replacing actual data stored on the target storage volume with the physical copy of the at least one actual data block and at least one difference stored on the point in time storage volume based on the undo command after receiving the at least one modified actual data block.

BRIEF DESCRIPTION OF THE DRAWINGS

FIG. 1 is a block flow diagram of an embodiment of the method of the present invention showing the UNDO feature;

FIG. 2 is a block flow diagram of an embodiment of the method of the present invention showing the UNDO and REDO features;

FIG. 3 is a block flow diagram of an embodiment of the method of the present invention showing the details of the UNDO sequence;

DETAILED DESCRIPTION

Figure 4:
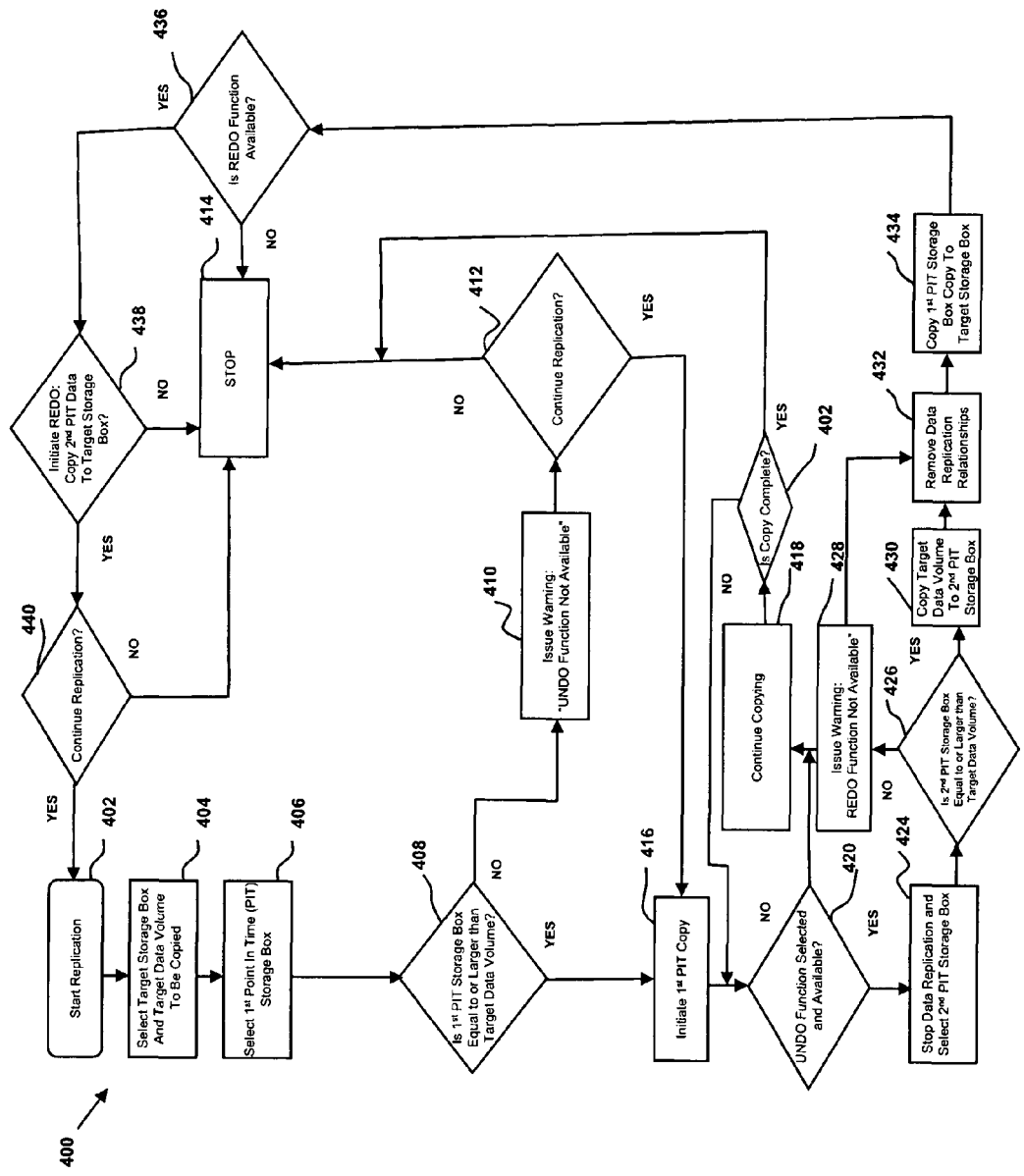
FIG. 4 is a block flow diagram showing the details of an embodiment of the present invention.

As shown in FIG. 1, the block flow diagram of an embodiment of the system, method and computer readable medium with program instructions for replicating a volume of data is illustrated (100). The system, method and computer readable medium with program instructions begins execution when the point in time (PIT) copy is initiated at block 102. The UNDO sequence is then executed by a management application in a single at block 104. It should be understood that the management application will include all the steps necessary to make an UNDO command available to the user and will be available in a single user implemented action. Upon completion of the UNDO management application 104, the target volumes are then returned or reverted to their original state with the data that was on the target volumes before the replication process began at block 106. Upon completion of these steps, the system, method and computer readable medium with program instructions end at block 108 and another replication process is available to immediately begin.

FIG. 2 illustrates another embodiment of the system, method and computer readable medium with program instructions for replicating a volume of data (200). The steps of creating a point in time copy at block 202 and carrying out the UNDO sequence executed in a single command by a management application, block 204 are similar to those shown in FIG. 1. To provide the image necessary to initiate a REDO command, a second PIT copy is initiated, created and completed at block 206. This second PIT copy is produced so that the system, method and computer readable medium with program instructions of the present invention can complete a REDO operation after the UNDO sequence is completed, if desired by the user. Upon completion of the UNDO sequence carried out by the management application at block 204 and the creation of the second PIT copy at block 206, the target volumes are then returned to their original state at block 208 with the same data that was on the target volumes before the replication process began. Block 210 provides the initiation of the REDO sequence which can begin when initiated by the user after the second PIT copy is created, block 206. This will allow the data to be replicated in the same manner as that started in block 202 with the elimination of any errors, if and when desired by the user. It should be noted that depending on the availability of resources, specifically the number of data drive volumes available to create point in time copies, any number of PIT copies can be created and maintained for later use. This will allow the user to choose a specific prior state or volume of data to be restored and replicated at any point in the data replication process.

The details of UNDO sequence are shown in FIG. 3. The management function carries out the UNDO sequence as identified at 300. Specifically, the management function initiates the UNDO sequence at block 302. The data replication process is stopped upon initiation of the UNDO sequence at block 304. Then all of the data replication relationships are removed at block 306 allowing the data to be restored as it was prior to beginning the replication process. In block 308 the UNDO sequence is completed and the specific steps continue from where they left off in the replication process (See FIGS. 1 and 2).

Referring to FIG. 4, a detailed embodiment of the system, method and computer readable medium with program instructions for replicating a volume of data is shown at 400. Each and every time the replication process begins, the system of present invention is invoked to the extent that the resources exist and are available to create the PIT copies necessary to provide the UNDO and REDO functions. The replication process begins as in FIGS. 1 and 2 with initiating the first PIT copy command at 402. Concurrently therewith, at blocks 404 and 406, the target storage box, the specific volume of data and the first PIT storage box are selected in accordance with the system, method and computer program instructions for replicating a volume of data of the present invention. At block 408, the size of the volume of data is compared to the size of the first PIT storage box to determine if the UNDO function can be carried out. If the size of the volume of data is equal to or smaller than the PIT storage box, then the UNDO function will be available during the replication process. If the volume of data is larger than the first PIT storage box then the UNDO function will not be available during the replication process and a warning will be issued at block 410. If the user chooses to continue at block 412, then the replication process will continue without the UNDO function being available to the user. If the user chooses not to continue the replication process will stop at block 414 and the user can locate additional resources to proceed with the UNDO function.

At block 416 the first PIT copy is initiated and will continue at block 418 until the UNDO function is selected at block 420 or the first PIT copy is completed at block 422. If the replication process completes at block 422 then the process will stop at block 414 and the system will be available to begin another replication process upon the user's command.

If the UNDO function is available and selected at block 420, then the data replication process will stop and a second PIT storage box will be selected at block 424. At block 426 the size of the volume of data in the target storage box is compared to the size of the second PIT storage box to determine if the REDO function can be carried out. If the size of the volume of data in the target storage box is equal to or smaller than the second PIT storage box, then the REDO function will be available the upon completion of the UNDO sequence. If the volume of data in the target storage box is larger than the second PIT storage box then the REDO function will not be available upon completion of the UNDO process and a warning will be issued at block 428. At this point the UNDO sequence will continue as described below. If the REDO function is available then the target data volume will be copied to a second PIT storage box so the REDO function can be later chosen. The UNDO process will continue at block 432 where the data replication relationships are removed then, at block 434, the first PIT storage box copy is copied to the target storage box reverting the data to the original form prior to beginning the replication process in block 402.

If the REDO function is available at block 436 then the REDO function can be carried out at block 438 if so chosen by the user. If the user chooses not to enable the REDO function the replication process will stop at block 414. If the REDO function is initiated then the 2nd PIT storage box is copied to the target storage box at 438. The data is then in the same form it was at the time the data replication was stopped in block 424 thereby allowing the replication process to continue from where it left off. If the user chooses to initiate the REDO function then data replication will continue at block 440 by carrying out block 402 again or stopping and waiting to choose the next process at 414.

It will be understood that all steps necessary to make the UNDO command available to the user of the system, method and computer readable medium with program instructions for replicating a volume of data will be implemented by the data replication management application. It will be further understood that all such steps will be executed by a single command to the data management application. The user will provide the management application with a pool of volumes for each target storage box that will be used to maintain the data needed to UNDO the data writes and return the target volumes to their original states before they were used as a data replication target.

In operation, when the start replication command is issued in blocks 102, 202 or 402 (FIGS. 1, 2 and 4) the management application will first create point in time (PIT) copies of all target volumes that will be affected by the start command. The PIT copy command will be executed relatively quickly and will not unduly delay the start of data replication. Data replication will then continue normally. The management application will ensure that a pool of volumes of proper type and size are set aside to carry out all of the necessary PIT copies. If the allocated resources are not sufficient, a warning will be issued informing the user that the UNDO command will not be available this session.

During operation of the system, if the user desires to UNDO the start replication command, the user will issue the UNDO command to the management application. The management application without, further action by the user, will carry out all of the steps necessary to complete the UNDO command and return the original data back to all of the target volumes in the session.

Specifically, as described above, the management application will carry out the following steps during operation: 1.) stop the data replication from continuing; 2.) remove the data replication relationships to enable data to be restored from the PIT copies to the target volumes; 3.) before restoring the data, the application will create another set of PIT copies from the current target volumes to provide implementation of a REDO command after the UNDO command is completed, if desired; 4.) if the allocated resources are not sufficient, a warning will be raised to the user that the REDO command will not be available for this session; and 5.) after the REDO PIT copies are made, the management application will copy the UNDO PIT copies back to the target volumes to revert all target volumes back to the data they contained before replication started. At this point, the user is able to access the target volumes to save data or carry out additional functions including another replication process. The next step would be to either initiate the REDO command and then continue replication as is, or reconfigure the replication session to use different target volumes thus leaving the target volumes as they were originally.

Each time the start command is issued, the management application will again save PIT copies to allow another UNDO command to restore the target volumes. In this manner, if sufficient resources exist, the application may save multiple UNDO points and the user can sequence back through the various UNDO states and return to any desired one. If sufficient resources do not exist to have multiple UNDO PIT copies, then the oldest PIT copies will be recycled when the next start command is issued.

Figure 5:
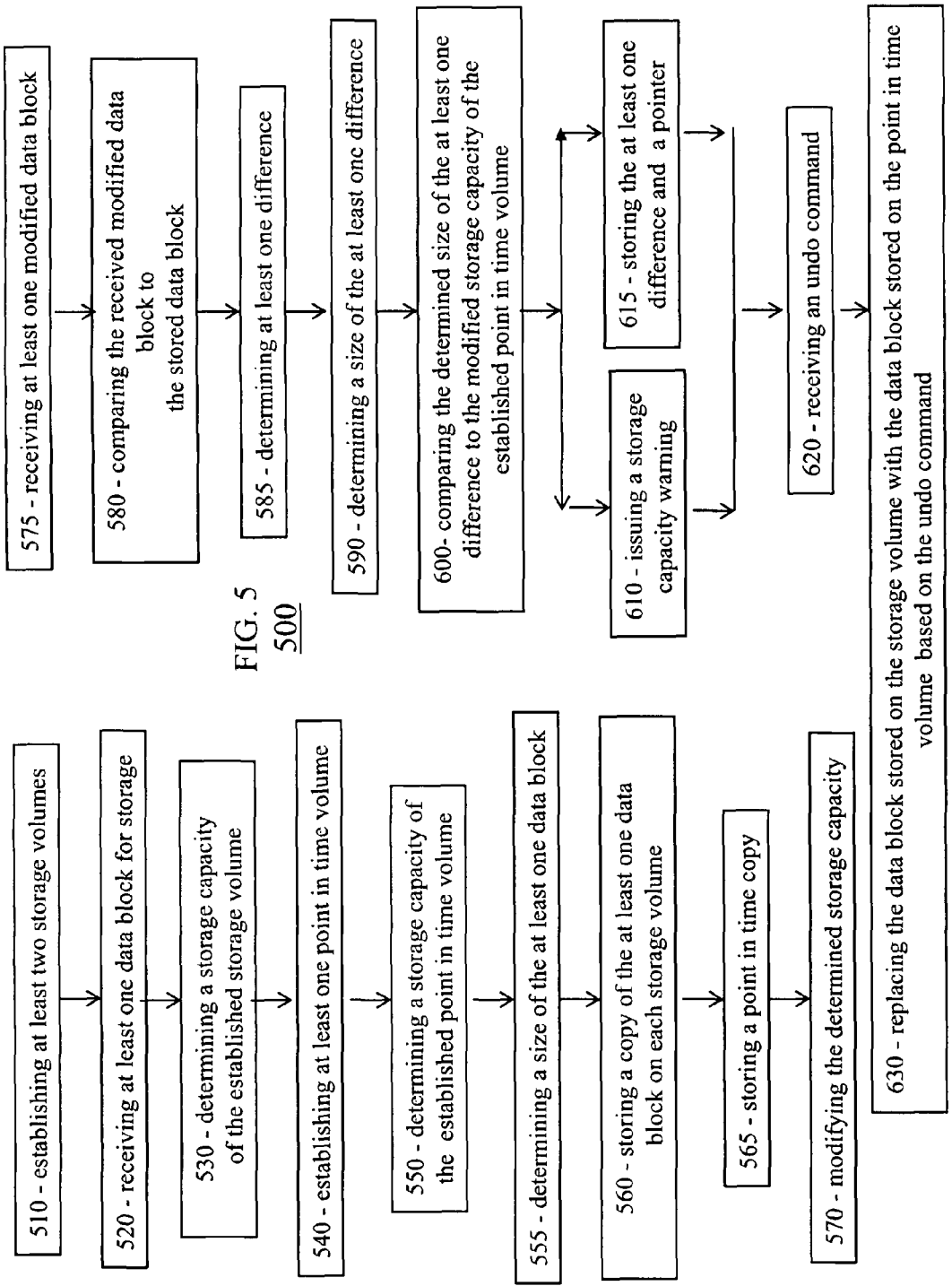
FIG. 5 is a block flow diagram showing the details of an embodiment of the present invention.

Another embodiment of a method 500 for replicating a volume of data is illustrated at FIG. 5, in accordance with one aspect of the invention. Method 500 begins by establishing at least two storage volumes for storing at leas tone data block, at step 510. In one embodiment, at least two storage volumes comprise a mirrored drive system. The storage volumes may be physically located near each other, or the storage volumes may be physically separated by a sizable distance, and communicate via a data network, such as the Internet. Each storage volumes can be distinct physical drives, drive partitions, or series of drives, such as a RAID system, or the like. The storage volumes are established so that data written to a first storage drive is automatically replicated to at least one other storage drive. Having established the storage volumes, at least one data block is received for storage on the established storage volumes, at step 520. The data block is received, for example, at a central location, such as a storage controller, controller or memory coordinator. The storage capacity for each established storage volume is determined at step 530. The storage capacity is a measure of how many bits of data each storage volume can store.

At least one point in time volume is established at step 540, and the storage capacity of the point in time volume is determined at step 550. The point in time volume is a storage volume, such as a distinct physical drive, drive partition, or system of drives. The storage capacity of the point in time volume is a measure of the number of bits that can be stored on the point in time volume.

The size of the received data block is determined at step 555. In one embodiment, the size of the received data block is measured in the number of bits within the received data block. The received data block is stored on at least one of the storage volumes at step 560. In one embodiment, the received data block is then mirrored to at least one other storage volume.

A point in time copy is stored on the point in time volume at step 565. The point in time copy is a snapshot of the data stored on at least one of the storage volumes. The determined storage capacity of the point in time copy is then modified based on a size of the stored point in time copy at step 570. In one embodiment, the size of the stored point in time copy is subtracted from the storage capacity of the point in time volume.

At least one modified data block is received after storing at least one data block, at step 575. The modified data block is then compared to the stored data block on the at least one storage volume at step 580, and any differences between the stored data block and the modified data block at determined at step 585. If there are any differences, the size of the different portions of the modified data block are determined at step 590, and the size of the different portions of the modified data block is compared to the modified storage capacity of the point in time volume, at step 600.

Based on the comparison, a storage capacity warning is issued when the compared determined size of at least one difference is greater than or equal to the modified storage capacity of the established point in time volume at step 610. Alternatively, at least one difference and a pointer are stored on the point in time volume when the compared determined size of the difference is less than the modified storage capacity of the established point in time volume at step 615.

An undo command is received at the central location at step 620. Based on receiving the undo command, the central location accesses the point in time volume and locates the most recent pointer at step 630. Based on the located pointer, the central location replaces the data block stored on the storage volumes with the corresponding modified data blocks from the point in time volumes at step 630.

Another embodiment of a method for data replication includes setting up a mirrored data server. The mirrored data server includes at least one mirrored drive, its mirror and a point in time server. The point in time server operates to store a point in time copy of data on the mirrored drive. In one embodiment, the point in time server stores a series of modifications to the mirrored drive with a pointer to each modification. In another embodiment, the point in time server stores a series of complete copies of the mirrored server, although those of skill in the art will recognize the storage limitations occasioned by such embodiments. Having set up the mirrored system with a point in time copy, a central location receives an undo data replication command, and accesses the point in time server using a pointer associated with the undo command and restores the mirrored system based on the data associated with the pointer. In the event that data modifications are to be made to the mirrored server at a time when the point in time server has insufficient storage capacity to provide for the storage of the data modifications, a warning will be directed to the user indicating that the undo capacity will either be disabled due to storage concerns, or that the data storage on the point in time server will be altered according to an inventory control rule, such as first-in-first-out, or last-in-first-out, or other such rules.

Those of skill in the art will recognize that the disclosures provided herein provide for an automated integration of an undo capacity for replications of data in a mirrored storage system. To the extent that the point in time storage volumes have sufficient capacity to store the modifications to data blocks stored on the storage volumes, the pointers stored on the point in time volumes provide the mechanism to restore data replication at any point in the past. Thus, multiple 'levels' of undo capability are provided, based on the amount of storage capacity. Indeed, the only actual inputs by a user are the identification of storage volumes and point in time volumes, a data block input, and the undo command.

It is contemplated that available techniques such as space efficient flash copy will be used where applicable to reduce the number of volumes needed to achieve the UNDO functionality included in the present invention. Those skilled in the art will recognize that the techniques and embodiments described herein may be implemented with desirable results in all types of data base systems. It is to be understood that several of the steps disclosed in the flow charts of FIGS. 1-4 including but not limited to the adjustment of the circuit parameters or timing could be performed by software programmed to carry out such steps. These steps could be performed, by way of example only, through software or a program storage device which may be part of a digital computer or computer network. In accordance with the present invention, the program or storage device may be implemented by a processor within a computer that executes a series of computer-executable instructions. These instructions may reside, for example, in RAM, ROM or other storage media of the computer. Alternatively, the instructions may be contained on a data storage medium, such as a computer CD, DVD, ROM, RAM or diskette. Furthermore, the instructions may be stored on a DASD array, magnetic tape, conventional hard disk drive, electronic read-only memory, flash memory, optical storage device, or other appropriate data storage device. In such an alternate embodiment, the computer-executable instructions may be lines of compiled executable code as available in any computer executable code, steps or language.

While the present invention has been described above in terms of specific embodiments, it is to be understood that the invention is not intended to be confined or limited to the preferred embodiments disclosed herein and that the scope of the present invention fully encompasses other embodiments which may become obvious to those skilled in the art. In addition, while specific component values have been show for ease of illustration and description, it should be understood that a variety of combination of values is possible and contemplated by the present invention. Further, while specific connections have been used and shown for ease of description, it should also be understood that a variety of connection points are possible and may vary depending on the specifics of the application and circuit used. These and all other such modifications and changes are considered to be within the scope of the appended claims and that the scope of the present invention is accordingly to be limited by nothing other than the appended claims.

We claim:

1. A method for replicating a volume of data stored on a source storage box, comprising:
    selecting a target storage box to receive a physical copy of the actual volume of data stored on the source storage box for replication of the actual volume of data;
    selecting a point in time storage box to receive a physical copy of actual data stored on the target storage box prior to the target storage box receiving the physical copy of the actual volume of data stored on the source storage box;
    physically copying actual data stored on the target storage box to the point in time storage box prior to the target storage box receiving the physical copy of the actual volume of data stored on the source storage box;
    performing the replication of the actual volume of data by initiating the physical copying on the target storage box of the actual volume of data stored on the source storage box after the actual data stored on the target storage box is physically copied to the point in time storage box; and
    selectively undoing the physical copying on the target storage box of the actual volume of data on the source storage box by replacing the current actual data stored on the target storage box with the physical copy of actual target storage box data stored on the point in time storage box after the actual volume of data stored on the source storage box is physically copied to the target storage box.

2. The method of claim 1, further comprising:
    selecting a second point in time storage box to receive a physical copy of actual data stored on the target storage box when undoing of the physical copying on the target storage box of the actual volume of data on the source drive is selected; and
    after selectively undoing the physical copying on the target storage box of the actual volume of data on the source drive, selectively redoing the physical copying on the target storage box the actual volume of data on the source storage box by replacing the actual data stored on the target storage box after undoing the physical copying on the target storage box of the actual volume of data on the source drive with the physical copy of actual target storage box data stored on the second point in time storage box.

3. The method of claim 1, further comprising comparing a size of actual data stored on the target storage box prior to the target storage box receiving the physical copy of the actual volume of data stored on the source storage box to a size of the point in time storage box, and issuing a warning if the size of the actual data stored on the target storage box prior to the target storage box receiving the physical copy of the actual volume of data stored on the source storage box is greater than the size of the point in time storage box.

4. The method of claim 2, wherein selectively undoing the physical copying on the target storage box of the actual volume of data on the source drive and selecting a second point in time storage box are carried out by a management application through a single user command.

5. The method of claim 2, wherein selectively undoing the physical copying on the target storage box of the actual volume of data on the source drive and selecting a second point in time storage box are automatically carried out by a management application.

6. The method of claim 2, further comprising comparing the size of the second point in time storage box to the size of the physical copy of the actual data stored on the target storage box when undoing of the physical copying on the target storage box of the actual volume of data on the source drive is selected and issuing a warning if the size of the second point in time storage box is smaller than the physical copy of the actual data stored on the target storage box when undoing of the physical copying on the target storage box of the actual volume of data on the source drive is selected.

7. The method of claim 1, further comprising selecting a second point in time storage box to receive a physical copy of actual data stored on the target storage box after physical copying on the target storage box of the actual volume of data stored on the source storage box is initiated but before physical copying on the target storage box of the actual volume of data stored on the source storage box is completed.

8. The method of claim 7, wherein the point in time storage boxes comprise flash memory.

9. The method of claim 7, further comprising selectively undoing the physical copying on the target storage box of the actual volume of data on the source drive by removing data replication relationships between the source storage box and the target storage box and replacing the current actual data stored on the target storage box with the physical copy of actual target storage box data stored on the second point in time storage box.

10. A computer readable medium with program instructions comprising:
(a) selecting a target storage box to receive a physical copy of an actual volume of data stored on a source storage box for replication of the actual volume of data;
(b) selecting a point in time storage box to receive a physical copy of actual data stored on the target storage box prior to the target storage box receiving the physical copy of the actual volume of data stored on the source storage box;
(c) physically copying actual data stored on the target storage box to the point in time storage box prior to the target storage box receiving the physical copy of the actual volume of data stored on the source storage box;
(d) performing the replication of the actual volume of data by physically copying on the target storage box the actual volume of data stored on the source storage box after the actual data stored on the target storage box is physically copied to the point in time storage box; and
(f) selectively undoing the physical copying on the target storage box of the actual volume of data on the source storage box by replacing the actual data stored on the target storage box with the physical copy of actual target storage box data stored on the point in time storage box after the actual volume of data stored on the source storage box is physically copied to the target storage box.

11. The medium of claim 10, wherein the instructions further comprise selecting a second point in time storage box to receive a physical copy of actual data stored on the target storage box after physically copying on the target storage box of the actual volume of data stored on the source storage box is initiated but before physical copying on the target storage box of the actual volume of data stored on the source storage box is completed.

12. A system for replicating a data volume stored on a source storage box by initiating a point in time copy, comprising:
a target storage box to receive a physical copy of the actual data volume stored on the source storage box for replication of the actual volume of data;
a point in time storage box to receive a physical copy of actual data stored on the target storage box prior to the target storage box receiving the physical copy of the actual data volume stored on the source storage box; and
a data manager to selectively undo physical copying of the actual data volume stored on the source storage box by replacing at least the copied actual data stored on the target storage box with the physical copy of actual target storage box data stored on the point in time storage box after the actual volume of data stored on the source storage box is physically copied to the target storage box.

13. The system of claim 12, further comprising a second point in time storage box to receive a physical copy of actual data stored on the target storage box when undoing of the physical copying of the actual data volume stored on the source storage box is selected and further comprising a data manger to selectively redo physical copying of the actual data volume stored on the source storage box by replacing the actual data stored on the target storage box after undoing the copying of the data volume stored on the source storage box with the physical copy of actual target storage box data stored on the second point in time storage box.

14. The system of claim 12, further comprising a data manager to compare a size of actual data stored on the target storage box prior to the target storage box receiving the physical copy of the actual volume of data stored on the source storage box to a size of the point in time storage box and generating a warning if the size of the actual data stored on the target storage box prior to the target storage box receiving the physical copy of the actual volume of data stored on the source storage box is greater than the size of the point in time storage box.

15. The system of claim 14, wherein the data manager compares the size of data stored on the target storage box prior to the target storage box receiving the physical copy of the actual volume of data stored on the source storage box to a size of the point in time storage box, selectively undoes the physical copying on the target storage box of the actual volume of data on the source drive, and removes the data replication relationships through a single user command.

16. The system of claim 13, further comprises means for comparing a size of actual data stored on the target storage box prior to the target storage box receiving the physical copy of the actual volume of data stored on the source storage box to a size of the point in time storage box and issuing a warning if the size of actual data stored on the target storage box prior to the target storage box receiving the physical copy of the actual volume of data stored on the source storage box is greater than the physical copy of the actual volume of data.

17. The system of claim 12, further comprising a second point in time storage box to receive a physical copy of actual data stored on the target storage box after physical copying on the target storage box of the actual volume of data stored on the source storage box is initiated but before physical copying on the target storage box of the actual volume of data stored on the source storage box is completed.

18. The system of claim 17, wherein the multiple point in time storage boxes each comprise flash memory.

19. The system of claim 17, wherein the data manager selectively undoes the physical copying on the target storage box of the actual volume of data on the source drive by removing data replication relationships between the source storage box and the target storage box and replacing the current actual data stored on the target storage box with the physical copy of actual target storage box data stored on the second point in time storage box.

20. A method for replicating a volume of data, comprising:
establishing at least a source storage volume and a target storage volume, the target storage volume being configured to receive a physical copy of at least one actual data block stored on the source storage volume for replication of the at least one actual data block;
establishing at least one point in time storage volume;
determining a storage capacity of the established point in time storage volume;
determining a size of the at least one actual data block;
performing a replication of the at least one actual data block by storing a physical copy of the at least one actual data block stored on the source storage volume on the target storage volume;
storing on the point in time storage volume a point in time physical copy of the actual data stored on the target storage volume after storing on the target storage volume the physical copy of the at least one actual data block stored on the storage volume;
modifying the determined storage capacity of the established at least one point in time storage volume based on a size of the stored point in time physical copy;
receiving at least one modified actual data block stored on the source storage box after storing the physical copy of the at least one actual data block on the target storage volume;
comparing the at least one modified actual data block stored on the source storage volume to the physical copy of at least one actual data block stored on the target storage volume;
determining at least one difference between the modified actual data block and the at least one actual data block stored on the target storage volume based on the comparison;
determining a size of the at least one difference;
comparing the determined size of the at least one difference to the modified storage capacity of the established at least one point in time storage volume;
issuing a storage capacity warning when the determined size of the at least one difference is greater than or equal to the modified storage capacity of the established at least one point in time storage volume;
storing the at least one difference and a pointer on the point in time storage volume when the determined size of the at least one difference is less than the modified storage capacity of the established at least one point in time storage volume;
receiving an undo command after storing the at least one difference and pointer on the point in time storage volume, the undo command associated with a request to restore the actual data on the target storage volume to a state corresponding with the pointer; and
replacing actual data stored on the target storage volume with the physical copy of the at least one actual data block and at least one difference stored on the point in time storage volume based on the undo command after receiving the at least one modified actual data block.

* * * * *